United States Patent [19]
Van Der Kruk

[11] Patent Number: 5,901,006
[45] Date of Patent: May 4, 1999

[54] APPARATUS FOR RECORDING INFORMATION SIGNALS ON A RECORD CARRIER

[75] Inventor: Willem L. Van Der Kruk, Eindhoven, Netherlands

[73] Assignee: U.S. Philips Corporation, New York, N.Y.

[21] Appl. No.: 08/798,680

[22] Filed: Feb. 12, 1997

[30] Foreign Application Priority Data

Feb. 16, 1996 [EP] European Pat. Off. .............. 96200397

[51] Int. Cl.⁶ .................................................... G11B 15/18
[52] U.S. Cl. .............................. 360/69; 360/72.2; 360/75
[58] Field of Search .................................. 360/69, 70, 71, 360/72.2, 73.04, 75, 39, 48, 54, 55; 369/54, 53, 58, 59, 47

[56] References Cited

U.S. PATENT DOCUMENTS

| 4,991,040 | 2/1991 | Fukda et al. ............................... 360/92 |
| 5,579,185 | 11/1996 | Tsai et al. ................................... 360/71 |
| 5,602,649 | 2/1997 | Shin .................................... 360/72.1 X |

FOREIGN PATENT DOCUMENTS

| 0580253 A2 | 1/1994 | European Pat. Off. . |
| 3049296 C2 | 9/1981 | Germany . |
| WO9612283 | 4/1996 | WIPO . |

*Primary Examiner*—Muhammad N. Edun
*Attorney, Agent, or Firm*—Edward W. Goodman

[57] ABSTRACT

An apparatus for recording an information signal in a track on the record carrier, such as, a helical scan video recorder, includes an input terminal (36) for receiving the information signal, a signal processor (10) for converting the information signal into a form in which it can be recorded on the record carrier (1) and a writing unit (30,32,34) for writing the converted information signal in the track on the record carrier. Further, the apparatus includes a unit for establishing the total length of the record carrier, viewed in time, a unit for establishing the actual position of the writing unit along the record carrier, viewed in time, and a unit (5,6) for transporting the record carrier. For recording an information signal of specific duration ($T_2$), on the record carrier (1), the record carrier is transported to a specific position along the record carrier for which holds that the remaining time for recording, at that specific position, substantially corresponds to the specific duration ($T_2$) of the information signal to be recorded.

10 Claims, 2 Drawing Sheets

APPARATUS FOR RECORDING INFORMATION SIGNALS ON A RECORD CARRIER

BACKGROUND OF THE INVENTION

Field of the Invention

The invention relates to an apparatus for recording an information signal in a track on the record carrier, the apparatus comprising input means for receiving the information signal, signal processing means for converting the information signal into a form in which it can be recorded on the record carrier, writing means for writing the converted information signal in the track on the record carrier, means for establishing the total recording length of the record carrier, viewed in time, and means for establishing the actual position of the writing means with respect to the record carrier, viewed in time, and means for positioning the writing means and the record carrier relative to each other.

DESCRIPTION OF THE RELATED ART

Such an apparatus is well known in the art, such as in the form of a helical scan video recorder. Reference is made in this respect to German Patentschrift DE 30.49.296, document D1 in the list of related documents, given below. In this embodiment of the invention, the record carrier is a longitudinal record carrier and the means for positioning comprises means for transporting the record carrier.

Video recorders can be programmed to record TV programs that will be broadcast at a later time. The record carrier, included in a cassette, must be long enough so that the apparatus can record the programmed TV programs without 'running out of tape', while further not overwriting earlier recorded TV programs that have not been seen by the user.

SUMMARY OF THE INVENTION

The invention aims at providing an apparatus with an improved way of recording information signals onto the record carrier, which results in a more efficient use of the record carrier. To that purpose, the apparatus in accordance with the invention is characterized in that the means for positioning are further adapted to relatively position the writing means and the record carrier to each other at a specific position on the record carrier, said specific position having a relationship with the remaining time for recording information on said record carrier, and that for recording an information signal of specific duration, on said record carrier, the means for positioning are adapted to relatively position the writing means and the record carrier to each other at such a position on the record carrier that the remaining time for recording at that specific position substantially corresponds to the specific duration of the information signal to be recorded.

Such an apparatus, which is further adapted to record an information signal in a track on the longitudinal record carrier, and wherein the means for positioning comprising means for transporting the record carrier, is characterized in that the means for transporting the record carrier are further adapted to transport the record carrier to a specific position along the record carrier, said specific position having a relationship with the remaining time for recording information on said record carrier, and that for recording an information signal of specific duration, on said record carrier, the means for transporting are adapted to transport the record carrier to a specific position along the record carrier that the remaining time for recording at that specific position substantially corresponds to the specific duration of the information signal to be recorded.

More specifically, this apparatus which is adapted to record a first information signal of a first predetermined duration, and a second information signal of a second predetermined duration on the record carrier, is further characterized in that the apparatus is adapted to record the first information signal on the record carrier, starting from the beginning of the record carrier, to stop recording after said predetermined first duration, to transport the record carrier to a specific location along the record carrier where the remaining time for recording at that specific position substantially corresponds to the second specific duration, and to record the second information signal starting from said specific position.

The basis of the invention will be explained with reference to the recording of a TV program on a longitudinal record carrier. In accordance with the invention, a first TV program of specific duration can be recorded on the record carrier, starting from the beginning of the record carrier. A second TV program that should be recorded later on that record carrier is normally recorded directly after the first TV program on the record carrier. Contrary to this, in accordance with the invention, the second TV program is recorded further forwards on the record carrier, such that the start of recording the second TV program is at such location along the length direction of the record carrier that the second TV program can exactly be recorded on the last portion of the record carrier. As a result, the terminal point of the recording of the second TV program (more or less) exactly coincides with the termination of the record carrier.

The apparatus may be further characterized in that the means for transporting are adapted to transport the record carrier to the beginning of the record carrier, the apparatus further being adapted to record the third information signal, starting from the start position on the record carrier and to stop recording after said predetermined third duration, or may be characterized in that the means for transporting are adapted to transport the record carrier to a specific location along the record carrier for which holds that the remaining time for recording at that specific position substantially corresponds to the third specific duration, the apparatus further being adapted to record the third information signal starting from said specific position.

In this way, a third TV program may be either recorded over the first TV program recorded earlier, without overwriting the second TV program, so that the user may still watch the second TV program, or may be recorded over the second TV program recorded earlier, without overwriting the first TV program, so that the user may still watch the first TV program.

BRIEF DESCRIPTION OF THE DRAWINGS

These and other aspects of the invention will be apparent from and elucidated further with reference to the embodiments described in the drawings, in which

FIG. 1 shows an embodiment of the apparatus in accordance with the invention. The apparatus is in the form of a video recorder for recording video signals onto a longitudinal record carrier 1, by recording slant tracks of video information on the record carrier 1. The record carrier 1 is wound partly on a take up reel 2 and partly on a supply reel 3 and is fed around a rotating head drum 30 on which two or more magnetic heads are positioned. In the present example, two heads 32 and 34 are shown positioned at 180° around the circumference of the head drum 30. The reels 2 and 3 are driven by a take-up reel motor 5 and a supply reel motor 6, respectively. A central processing unit 10 is provided for controlling all the functions of the video recorder, such as, the velocity of the motors 5 and 6 and the duration of tape transport. To that purpose, tacho generators 12 and 14 are provided, one for each of the motors 5 and 6, respectively. Tacho signals are supplied by the tacho generators via the lines 16 and 18, respectively, to the central processing unit 10. In response to the tacho signals and in response to other information, such as, manual actuation by a user of mode selection switches located externally on the housing of the video recorder, or on a remote control unit of the video recorder, see the input block 20, the central processing unit 10 generates drive signals on the lines 22 and 24 for driving the motors 5 and 6 respectively. The central processing unit 10 also generates a drive signal (not shown) for the rotating head drum 30. Further, generally, a capstan (not shown) is also present, which is also driven by a capstan motor (not shown). The central processing unit also generates a drive signal for driving the capstan motor.

Figure 1:
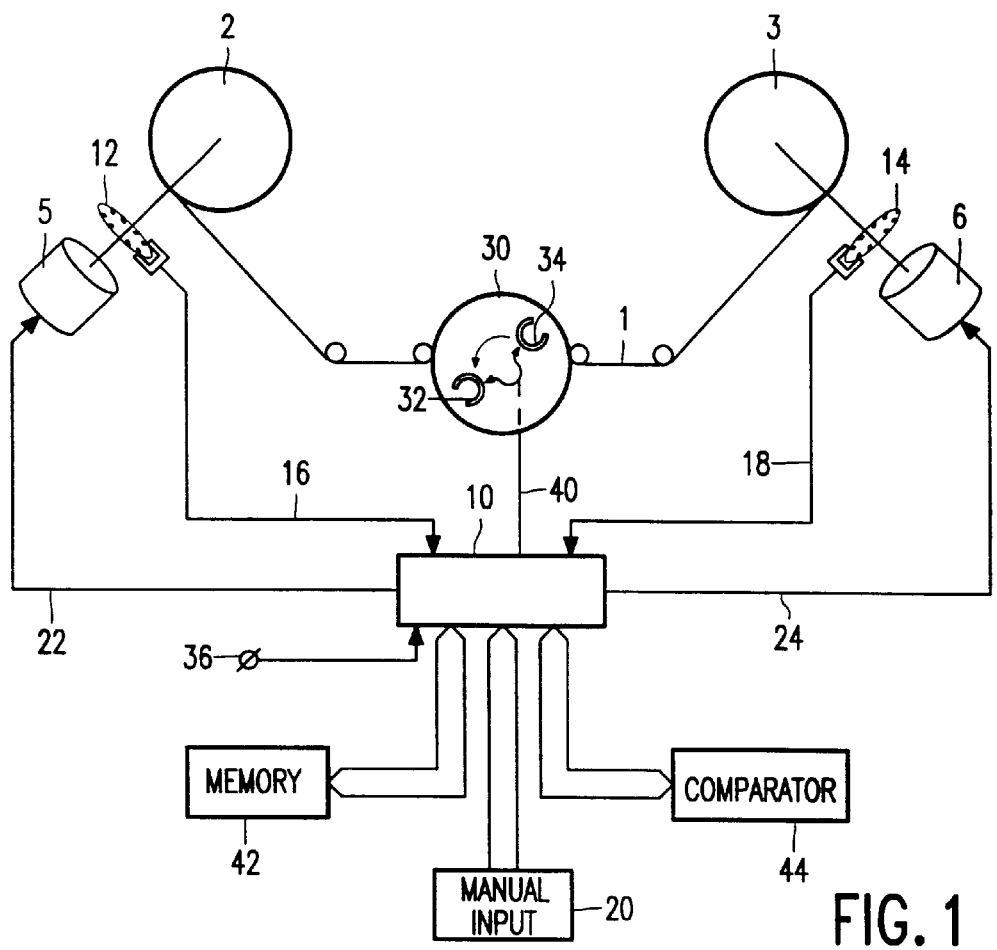
FIG. 1 shows an embodiment of the apparatus.

An input terminal 36 is provided for receiving a video signal for recording in the slant tracks on the record carrier 1. The input terminal 36 is coupled to an input of the central processing unit 10. The central processing unit 10 converts the video signal into a form in which the video signal can be recorded on the record carrier. Such signal processing is well known in the art. The converted video signal is supplied via the line 40 to the heads 32 and 34 for recording on the record carrier 1.

The apparatus is capable of determining the total length of a record carrier inserted in the apparatus. This is also well known in the art. This can be realized by shortly transporting the record carrier 1 in one or both directions and determining the number of tacho pulses generated by the tacho generators 12 and 14. Reference is made to various publications in the prior art, such as German Patentschift DE 30.49.296, document (1) in the list of related documents, U.S. patent application Ser. No.08/096,378, filed Oct. 10, 1995, corresponding to EP 580.253, document (2) in the list of related documents, and U.S. patent application Ser. No. 08/541,378, filed Oct. 10, 1995, corresponding to International Patent Application WO 96/12283 (PHN 15.045), document (3) in the list of related documents. This total length of the record carrier can be expressed in 'total recording time'.

In an equivalent manner, the apparatus is capable of determining the actual position of the heads and the head drum which respect to the record carrier, viewed in the longitudinal direction of the record carrier 1. This actual position can be expressed in 'time used' and 'time left'.

The video recorder is provided with a memory 42 for storing information as regards TV programs to be recorded at a later stage. This information can be input via the manual input 20, such as, when programming a video recorder using the remote control, or by selecting this programming information using a teletext screen (programming via teletext). In such a situation, starting time and length of a TV program to be recorded is inputted, together with information about the date when the program is transmitted and the channel on which the program is transmitted.

Assume that the user inputs programming information for programming two TV programs, a first one having a length of $T_1$ and a second one of length $T_2$. The second program is broadcast later than the first one.

The user inserts a new cassette in the video recorder and the video recorder can establish, in the way given above, the total length $T_{tot}$ of the record carrier 1. The video recorder further has a comparator 44 and can establish, by comparing $T_{tot}$ and the sum of $T_1$ and $T_2$, that the total length $T_{tot}$ of the record carrier I in the cassette is longer than $T_1+T_2$.

The video recorder is now ready for recording the programmed TV programs.

Figure 2:
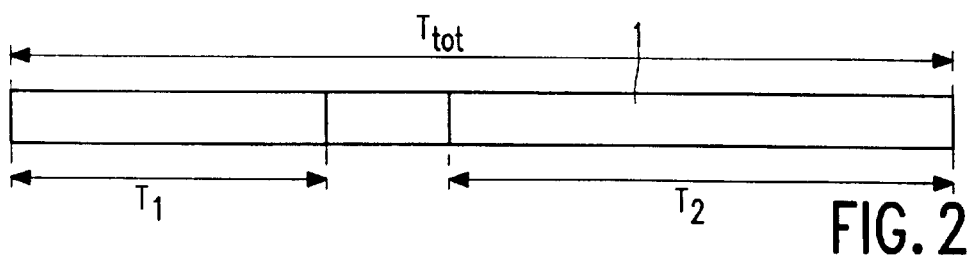
FIG. 2 shows the position of two TV programs recorded on the record carrier in accordance with the invention.

Upon the start of the broadcast of the first TV program, the video recorder starts recording the first TV program from the beginning of the record carrier 1. Recording is stopped a time interval $T_1$ later. This is shown in FIG. 2, which shows the first TV program recorded directly from the beginning of the record carrier 1 on said record carrier.

Normally, the video recorder remains in this position until the broadcast of the second TV program is started. In prior art video recorders, the second program is recorded directly after the first TV program on the record carrier 1.

Contrary to this, upon stopping recording of the first TV program, the video recorder switches into a fast forward transport mode so that the record carrier 1 is transported in forward direction. The fast forward transport mode is terminated at the instant where the 'time left' equals $T_2$, and the apparatus switches into the stop mode. The instant to stop the transport of the record carrier can be established by comparing, in the comparator 44, the 'time left' information obtained from the tacho pulses with $T_2$, stored in the memory 42.

At the start of the broadcast of the second TV program, the video recorder switches into the recording mode, so that the second TV program can be recorded on the record carrier. Recording stops at the end of the TV program, that is: a time interval $T_2$ later. As a result, the second TV program is recorded exactly at the end of the record carrier 1, as can be seen in FIG. 2. An empty portion of length $T_{tot}-T_1-T_2$ is located in between the two recorded TV programs, instead of at the end of the second TV program, as would be in prior art video recorders.

Figure 3:
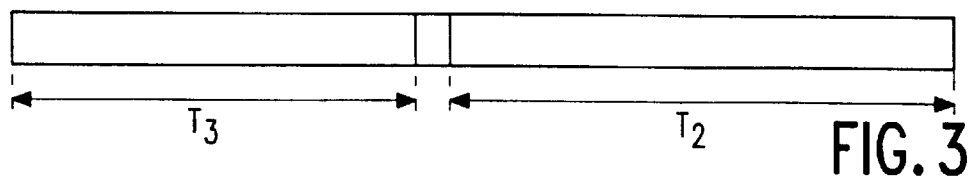
FIG. 3 shows the position of a third TV program recorded on the record carrier over the first TV program recorded.

The record carrier 1 being recorded in the way shown in FIG. 2 can be used more efficiently if the user wants to record a third TV program on it at a later moment. Suppose that the user has watched the first TV program, as recorded on the record carrier 1, but did not watch the second program. The first TV program may thus be overwritten. The user can now rewind the record carrier to its beginning and program the videorecorder for recording the third TV program. Suppose the third program has a length $T_3$, which is longer than the duration $T_1$ of the original first TV program, but shorter than $T_{tot}-T_2$. The record carrier 1 of FIG. 2 can now be used for recording the third program over the first program. At the instant of the start of the broadcast of the third TV program, the videorecorder starts recording and records the third TV program over the first TV program and also partly over the virgin area between the original first and second recordings, see FIG. 3. This would have been impossible when the second TV program is recorded directly behind the first TV program on the record carrier. Otherwise, one would have overwritten part of the not yet watched second TV program.

Figure 4:
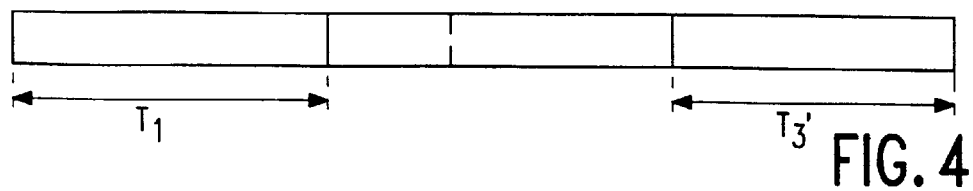
FIG. 4 shows the position of a third TV program recorded on the record carrier over the second TV program recorded, in accordance with the invention.

Suppose that the user has watched the second TV program, as recorded on the record carrier 1, but did not watch the first program. The second TV program may thus be overwritten. Suppose that a third program to be recorded has a length $T_3'$. In this situation, $T_3'$ may be shorter or is longer than the duration $T_2$ of the original second TV program, as long as it is shorter than $T_{tot}-T_1$. The record carrier 1 of FIG. 2 can again be used, but now for recording the third program over the second program. The user can instruct the video recorder to switch into the 'second program record mode' and program the video recorder to record the third program having a length $T_3'$ at a later time. The video recorder switches over to a fast forward or a fast rewind mode, dependent of the actual position of the record carrier, and transports the record carrier to a position where 'time left' equals $T_3'$. At the instant of the start of the broadcast of the third TV program, the video recorder starts recording and records the third TV program again in such a way on the record carrier that it is completely recorded in towards the end of the record carrier. This is shown in FIG. 4, where, in the present example, $T_3'$ has been chosen smaller than $T_2$. The situation given in FIG. 4 is again the same as the situation of FIG. 2, with the difference that the length of the TV program recorded at the end of the record carrier is smaller than in FIG. 2. So, a new TV program can be record later over the first program, after the user has watched the first program, and before he has watched the third program. This new program may be longer in time than the first program and will not overwrite the third program when the duration of the new program is smaller than $T_{tot}-T_3'$.

Figure 5:
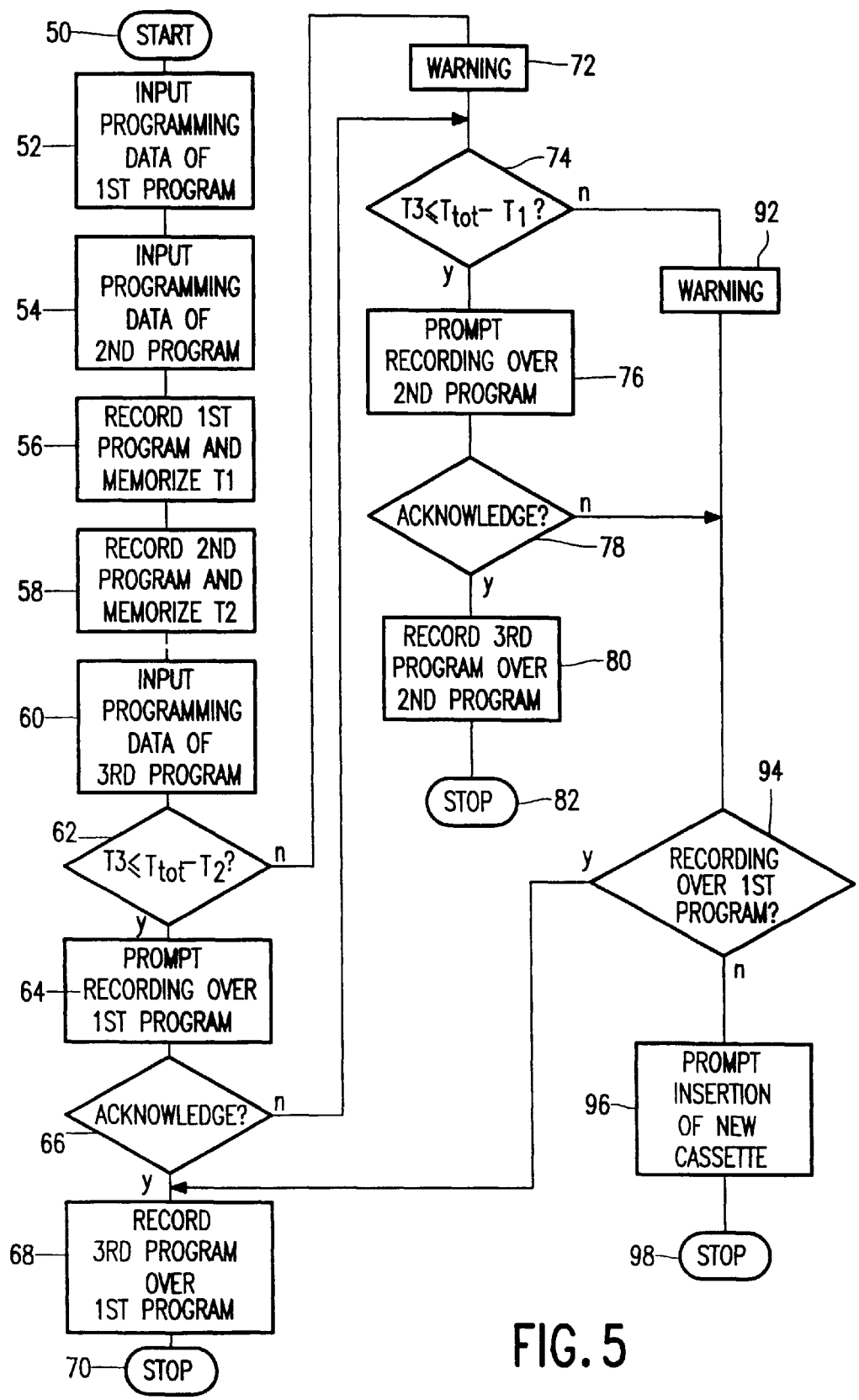
FIG. 5 shows an embodiment of a flow diagram of the functioning of the apparatus of FIG. 1.

FIG. 5 shows a flow diagram of a method of functioning of the video recorder. The user starts the flow diagram in block 50, where he starts programming the video recorder. More specifically, he programs the video recorder for recording a first TV program at a later moment. This is done in block 52, where the user inputs the programming data, such as, the date, the starting time of the broadcast and, the end time, and the channel on which the TV program is to be broadcast. This data is stored in the memory 42. Next, the user inputs programming data for a second TV program to be recorded. This is given in block 54. Again, the programming data is stored in the memory 42. When the video cassette inserted in the video recorder is a blank cassette, or the user has indicated that the cassette can be used as if it were a blank cassette, e.g., by pressing some button on the videorecorder, the video recorder will record the two TV programs in the way indicated in FIG. 2. This is indicated by the blocks 56 and 58. In a table-of-contents memory, the videorecorder stores the durations $T_1$ and $T_2$ of the two TV programs recorded. Storing the duration $T_2$ is necessary so that the video recorder can access the start point of recording of the second program.

At a later stage, the user wants to record a third TV program. The user thus inputs all programming data required, such as its length $(T_3)$, to record the third TV program at a later moment, see the block 60. Next, the video recorder compares $T_3$ with $T_{tot}-T_2$ in the comparator 44, see block 62. If $T_3$ appears to be smaller than or equal to $T_{tot}-T_2$, the third program can be recorded over the first program recorded earlier, without overwriting the second program. This can be indicated on a display, see the block 64, so that the user has the possibility to reject it, see block 66, eg. for the reason that he did not watch the first program yet. Upon acknowledgement, however, the video recorder records the third TV program over the first program in the way shown in FIG. 3, see the block 68, after which the flow diagram stops at the block 70.

In the case that the user rejects recording over the first program in the block 66, the flow diagram continues in the block 74, in which $T_3$ is compared with $T_{tot}-T_1$. If $T_3$ appears to be smaller than or equal to $T_{tot}-T_1$, the third program can be recorded over the second program recorded earlier, without overwriting the first program. This can be indicated on a display, see the block 76, so that the user has the possibility to reject it, see block 78, e.g., for the reason that he did not watch the second program yet. Upon acknowledgement, however, the video recorder records the third TV program over the second program in the way shown in FIG. 4, see the block 80, after which the flow diagram stops at the block 82. If $T_3$ appears to be larger than $T_{tot}-T_1$, a warning is given, see the block 92.

This means that recording of the third program over the second one, in the way shown in FIG. 4, will not only overwrite the second program but also partly overwrite the first program. The flow diagram continues in block 94, in which the user is (again) requested whether the third program can be recorded over the first program. If so, the flow diagram continues in block 68. If not, the video recorder prompts the user to insert a new cassette, see the block 96, and the flow diagram ends in block 98. Also in the case that the user does not acknowledge the recording over the second program in the block 78, the flow diagram continues in block 94.

If $T_3$ appears to be larger than $T_{tot}-T_2$ in the block 62, a warning is given, see the block 72. Next, the flow diagram continues in block 74, in which $T_3$ is compared with $T_{tot}-T_1$, as explained above.

While the present invention has been described with respect to preferred embodiments thereof, it is to be understood that these are not limitative examples. Thus, various modifications may become apparent to those skilled in the art, without departing from the scope of the invention, as defined by the claims. As an example, the invention has been described thus far with reference to a helical scan video recorder. It should however be noted that the invention is equally well applicable to other types of recorders for recording a video signal onto a record carrier. The record carrier need not be in longitudinal form but may be a disk-like record carrier, such as an erasable videodisk. Further, the record carrier may be a magnetic record carrier or an optical record carrier. The signal to be recorded need not necessarily be a video signal, but could equally well be an audio signal. Further, the invention lies in each and every novel feature or combination of features as herein disclosed.

RELATED DOCUMENTS (1) German Patentschrift DE 30.49.296
(2) U.S. patent application Ser. No. 08/096,581, filed Jul. 21, 1993, corresponding to European Patent EP 580.253 (PHD 92-092)
(3) U.S. patent application Ser. No. 08/541,378, filed Oct. 10, 1995, corresponding to International Patent Application WO 96/12283 (PHN 15.045).

I claim:

1. An apparatus for recording an information signal in a track on the record carrier, the apparatus comprising:

input means for receiving the information signal;

signal processing means for converting the information signal into a form for recording on the record carrier;

writing means for writing the converted information signal in the track on the record carrier;

means for establishing a total recording length of the record carrier, said total recording length being expressed in time;

means for establishing an actual position of the writing means with respect to the record carrier, said actual position of the writing means being expressed in time; and means for positioning the writing means and the record carrier relative to each other, characterized in that the means for positioning positions the writing means and the record carrier relative to each other at a specific position on the record carrier, said specific position having a relationship with a remaining time for recording information on said record carrier, and that for recording an information signal of a specific duration on said record carrier, the means for positioning positions the writing means and the record carrier relative to each other at said specific position on the record carrier where the remaining time for recording at said specific position substantially corresponds to the specific duration of the information signal to be recorded.

2. Apparatus as claimed in claim 1, wherein the record carrier is a longitudinal record carrier, and the means for positioning comprises means for transporting the record carrier, characterized in that the means for transporting the record carrier transports the record carrier to a specific position along the record carrier, said specific position having a relationship with the remaining time for recording information on said record carrier, and that for recording an information signal of specific duration on said record carrier, the means for transporting transports the record carrier to said specific position along the record carrier such that the remaining time for recording at said specific position substantially corresponds to the specific duration of the information signal to be recorded.

3. Apparatus as claimed in claim 2, for recording a first information signal of a first predetermined duration, and a second information signal of a second predetermined duration on the record carrier, characterized in that the apparatus records the first information signal on the record carrier starting from the beginning of the record carrier, stops recording after said predetermined first duration, transports the record carrier to a specific location along the record carrier where the remaining time for recording at said specific position substantially corresponds to the second specific duration, and records the second information signal starting from said specific position.

4. Apparatus as claimed in claim 3, for recording a third information signal of a third predetermined duration on the record carrier, characterized in that the means for transporting transports the record carrier to the beginning of the record carrier, the apparatus further records the third information signal starting from the start position on the record carrier, and stops recording after said predetermined third duration.

5. Apparatus as claimed in claim 3, for recording a third information signal of a third predetermined duration on the record carrier, characterized in that the means for transporting transports the record carrier to a specific location along the record carrier where the remaining time for recording at said specific position substantially corresponds to the third specific duration, the apparatus further recording the third information signal starting from said specific position.

6. Apparatus as claimed in claim 3, characterized in that the apparatus further comprises:

memory means for storing information relating to the duration of the first and second information signals recorded on the record carrier, and for storing information relating to the start positions of the recorded first and second information signals on said record carrier;

means for storing information relating to a time duration of a third information signal to be recorded; and calculation means for calculating the time duration available for recording an information signal starting at the beginning of the record carrier until the location where the beginning of the second information signal has been recorded, for comparing the said time duration with the time duration of the third information signal, and for generating a first control signal when the time duration is smaller than the time duration of the third information signal.

7. Apparatus as claimed in claim 6, characterized in that the calculation means further calculates the remaining time for recording at a position along the record carrier substantially corresponding to the end position on the record carrier of the recording of the first information signal, compares said remaining time duration with the time duration of the third information signal, and generates a second control signal when said remaining time duration is smaller than the time duration of the third information signal.

8. Apparatus as claimed in claim 7, characterized in that, the apparatus records the third information signal in response to the absence of the second control signal, starting at a specific position along the record carrier where the remaining time for recording at said specific position substantially corresponds to the specific duration of the third information signal to be recorded.

9. Apparatus as claimed in claim 7, characterized in that the apparatus generates a warning signal in response to the occurrence of the first and/or the second control signal.

10. Apparatus as claimed in claim 6, characterized in that, the apparatus records the third information signal in response to the absence of the first control signal, starting at beginning of the record carrier.

* * * * *